US00RE36839E

United States Patent [19]

Simmons et al.

[11] E Patent Number: Re. 36,839

[45] Reissued Date of Patent: Aug. 29, 2000

[54] METHOD AND APPARATUS FOR REDUCING POWER CONSUMPTION IN DIGITAL ELECTRONIC CIRCUITS

[75] Inventors: Laura E. Simmons, Corvallis, Oreg.; Rajeev Jayavant, Fort Collins, Colo.

[73] Assignee: Philips Semiconductor, Inc., Sunnyvale, Calif.

[21] Appl. No.: 09/212,854

[22] Filed: Dec. 16, 1998

Related U.S. Patent Documents

Reissue of:

[64] Patent No.: 5,585,745
Issued: Dec. 17, 1996
Appl. No.: 08/686,272
Filed: Jul. 25, 1996

U.S. Applications:

[63] Continuation of application No. 08/388,312, Feb. 14, 1995, abandoned.

[51] Int. Cl.[7] ..... H03K 19/096; H03K 19/00

[52] U.S. Cl. ..... 326/93; 326/101; 327/544

[58] Field of Search ..... 326/93, 101, 21, 326/136; 327/544

[56] References Cited

U.S. PATENT DOCUMENTS

| | | | |
|---|---|---|---|
| 5,140,184 | 8/1992 | Hamamoto et al. | 326/93 |
| 5,239,215 | 8/1993 | Yamaguchi | 326/101 |
| 5,430,397 | 7/1995 | Itoh et al. | 326/101 |
| 5,638,009 | 6/1997 | Sutherland et al. | 326/93 |

FOREIGN PATENT DOCUMENTS

| | | |
|---|---|---|
| 0613074 A1 | 8/1994 | European Pat. Off. . |
| 0624837 A1 | 11/1994 | European Pat. Off. . |
| 2279473 | 1/1995 | United Kingdom . |

*Primary Examiner*—Jon Santamauro

[57] ABSTRACT

An integrated circuit with power conservation includes a number of functional blocks, each of which includes a digital circuitry and at least one output control line, and a power controller coupled to the control lines. The output control lines develop clock control signals based upon a functional block's knowledge of the direction of data flow. The power controller the reduces power by deactivating functional blocks that are not needed as indicated by the clock control signals. More specifically, a system with power conservation includes a number of functional blocks capable of processing data, each of the functional blocks including a modulated clock input and N+1 clock control lines which reflect the direction of data flow, where N is a number of neighbors of a particular functional block, and a clock controller having an input clock, the clock controller being coupled to the modulated clock inputs and the clock control lines of the functional blocks. The clock controller is operative to modulate the input clock in accordance with the signals on the clock control lines to provide modulated clocks to each of the plurality of functional blocks. A method for reducing power consumption includes the steps of: a) receiving control signals from a number of functional blocks; b) selectively deactivating a particular functional block upon a request from that functional block or from another functional block; and c) activating the particular functional block upon a request from another functional block.

37 Claims, 4 Drawing Sheets

METHOD AND APPARATUS FOR REDUCING POWER CONSUMPTION IN DIGITAL ELECTRONIC CIRCUITS

Matter enclosed in heavy brackets [ ] appears in the original patent but forms no part of this reissue specification; matter printed in italics indicates the additions made by reissue.

This is a continuation, of application Ser. No. 08/388,312 filed Feb. 14, 1995, now abandoned.

BACKGROUND OF THE INVENTION

This invention relates generally to digital electronic equipment, and more particularly to methods and apparatus for reducing power consumption for personal computer systems.

There are variety of reasons why computer designers wish to reduce power consumption in personal computers. Portable computers, for example, typically depend on batteries for power. Obviously, the less power consumed by the portable computer circuitry and peripherals, the longer the batteries will last. In addition to portable computer applications, it is also often desirable to have desktop computers that consume less power. This is because reduced power consumption reduces energy costs and, in a cumulative sense, reduces the negative environmental impacts of excessive energy consumption. Furthermore, desktop computers designed to consume less power also generate less heat, which means that they can be made smaller and with reduced cooling requirements.

The prior art has taken several approaches to reducing power consumption in personal computers. For example, many portable computers will shut down peripherals or very large functional system blocks (FSBs™) that haven't been used for a predetermined period of time. These type of systems typically use hardware or software timers. Another technique known in the prior art is "clock throttling", which reduces computer power consumption reducing the speed of the clock driving the digital circuitry. Since there is a direct relationship between clock rate and power consumption, any lowering of the clock rate will reduce power consumption.

The prior art methods for reducing power consumption and personal computer suffers a variety of drawbacks. For example, if peripherals are turned off to reduce power consumption, they are not immediately available when they are needed. This causes the time-costly procedure of powering up the required peripheral and waiting for it to become fully operational prior to continuing the desired operation that used that peripheral. With "clock throttling" techniques, the user will note a marked decrease in performance as the clock rate is throttled back. For example, a typical computer calculation may take twice as long if the clock rate is cut in half.

In the prior art, the methods for reducing power consumption were often implemented in software on the computer. By implementing the method in software, valuable computational time is lost to the power consumption reduction function. Other methods employed in the prior art, reduce power consumption through hardware devices which monitor energy usage or which use timers to shut off peripherals or FSBs. For example, the hardware functionality which reduces power consumption can be provided as a standalone integrated circuit, or it can be formed as part of a "chip set" used by the computer system. In either case, expensive, additional circuitry separate from the computer logic is required.

SUMMARY OF THE INVENTION

The present invention provides a method and apparatus for reducing power consumption in digital electronic circuits and, more particularly, in personal computer systems. Advantageously, the operation of the present invention is transparent to the computer system and to software running on the computer system.

An integrated circuit with power conservation in accordance with the present invention includes a number of functional blocks, each of which has digital circuitry and at least one output control line. The integrated circuit also includes a power controller coupled to the output control line of each of the functional blocks. During operation, the power controller reduces power consumed by selected functional blocks in response to control signals on the control lines. In essence, each functional block within the integrated circuit generates a signal indicating whether that functional block is busy and/or if a "neighboring" functional block will be required. These functional blocks can be arbitrarily small and are not limited to the fairly large functional system block (FSB™) circuitry of some previous power management techniques. FSB™ is a trademark of VLSI Technology, Inc. of San Jose, Calif. If a given functional block is not busy, it can be deactivated (by stopping its clock, disabling its power rails, etc.). The activation or deactivation of the functional blocks is controlled by the flow of data within the integrated circuit, allowing the integrated circuit to minimize power without any explicit intervention from software or hardware timers. Because the data flow controls the clocking, the present invention is particularly effective with such devices as PCI bus devices, or ISA/EISA bus slave devices.

In another aspect of the present invention, a system with power conservation includes a number of functional blocks capable of processing data, where each of the functional blocks include a modulated clock input and up to N+1 clock control lines, where N is the number of neighbors of a particular functional block that are connected to the particular functional block by a data path. The system with power conservation also includes a clock controller having an input clock, and is coupled to the modulated clock inputs and the clock control lines of the functional blocks. In this matter, each of the functional blocks can provide a signal to the clock controller requesting that it and/or its neighbors be activated or deactivated.

A method for reducing power consumption in a digital electronic circuit includes the steps of: a) receiving a control signal from a number of functional blocks; b) deactivating a particular functional block upon a request from that particular functional block or from another functional block, and in the absence of a request from another functional block requesting the activation of that particular functional block; and c) activating a functional block upon a request of another functional block. Each functional block consumes less power when deactivated than when activated. Preferably, the functional blocks are activated by providing a full-speed clock to the functional block, and are deactivated by not applying the clock to the block. This can be accomplished with a "modulated clock" which is derived from a regular output clock as modulated by signals provided by the clock control lines.

The present invention therefore has several advantages over the prior art. As mentioned previously, the operation of the present invention is transparent to the computer system and to software running in the computer system in that the power reduction method operates automatically based upon the flow of data within the digital circuit. Also, the present invention, by breaking the chip into number of clock regions or functional blocks, minimizes the problem of skew. This allows each functional block to be individually shut-down based upon usage and yet maintains a minimal clock skew within the clock regions. This allows critical data paths and state machines to run in full speed without skew problems. Since the number of functional regions are under the control of the chip designer, the clock driver and distribution for each functional block can be designed to minimize skew between the various blocks.

As noted previously, the present invention preferably activates and deactivates a functional block by controlling its clock. However, another aspect of the present invention is to control the power applied to the functional block. For example, part or all of the power rail to a particular functional block can be disabled to provide substantial power savings since the pad drivers of those functional blocks would no longer consume any power.

These and other advantages of the present invention will become apparent upon reading the following detailed description and studying the various figures of the drawings.

DETAILED DESCRIPTION OF THE PREFERRED EMBODIMENTS

Figure 1:
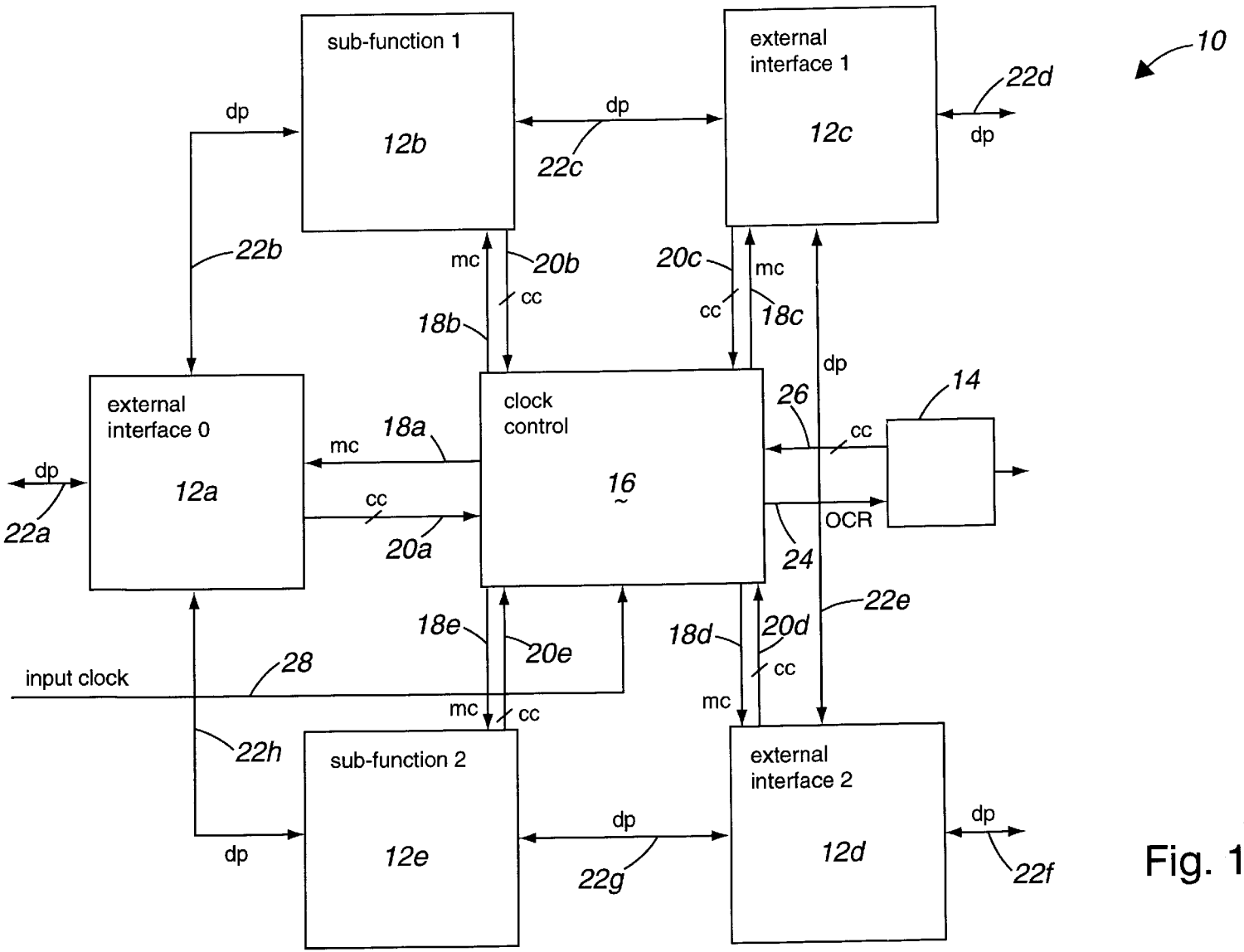
FIG. 1 is an example of a digital electronic circuit with reduced power consumption in accordance with the present invention.

In FIG. 1, a system 10 with power conservation includes a number of functional blocks 12 including blocks 12*a*, 12*b*, 12*c*, 12*d*, and 12*e*. The system 10 with power conservation also includes a special block 14 and a clock control 16. Preferably, the system 10 with power conservation is implemented as part of an integrated circuit. Alternatively, the system 10 can be implemented as a number of integrated circuits, or with discrete electronic devices.

The functional blocks 12 all include digital circuitry that are capable of processing data. Each of the functional blocks 12 include a modulated clock input line 18*a*, 18*b*, 18*c*, 18*d*, and 18*e*, respectively, for the functional blocks 12*a*–12*e*. The signal carried by the modulated clock inputs 18*a*14 18*e* are designated as "mc." Each of the functional blocks 12 also include clock control buses 20*a*, 20*b*, 20*c*, 20*d*, and 20*e*, respectively, for each of the functional blocks 12*a*–12*e*. The clock control buses 20*a*–20*e* are buses in that they typically include a number of control lines. Alternatively, any one or more of the clock control buses 20 could include only a single control line, in which case the clock control bus 20 reduces to a clock control line 20.

The functional blocks 12 are coupled to each other by data paths 22. More particularly, the exemplary system with power conservation of FIG. 1 includes data paths 22*a*, 22*b*, 22*c*, 22*d*, 22*e*, 22*f*, 22*g*, and 22*h*. These data paths 22*a*–2*h* are shown by way of example and will, of course, vary depending on the implementation of the system 10.

More particularly, in this example, functional block 12*a* is designated as "external interface 0." Data path 22*a* allows communication between the system 10 and an external system. Data path 22*b* connects external interface 0 to functional block 12*b* which, in this case, is designated as "sub-function 1." Data path 22*h* connects external interface 0 to functional block 12*e* which, in this example, is labeled "sub-function 2." Sub-function 1 and sub-function 2 are functional blocks of digital circuitry which perform data manipulation, but which do not communicate outside of the system 10.

Functional blocks 12*c* and 12*d*, respectively, are described as "external interface 1" and "external interface 2." External interface 1 communicates with sub-function 1 by data path 22*c*, and external interface communicates with sub-function 2 by data path 22*g*. External interface 1 and external interface 2 communicate with each other by data path 22*e*, external interface 1 communicates with systems outside of system 10 by data path 22*d*, and external interface 2 communicates with systems outside of system 10 by data path 22*f*.

Special block 14 is a block of digital circuitry which is intended to be never shut off during the operation of the system 10. An example of a special block 14 is DRAM refresh timer circuitry which must be operating all of the time. Therefore, the special block 14 is coupled to clock control 16 by a clock line 24 which carries the signal output clock regular (OCR). The special block 14 may or may not have a special clock control bus 26.

As it is apparent from the above discussion, the various functional blocks 12 have relationships depending upon their inter-connection by data paths ("dp"). For example, external interface 0 (functional block 12*a*) has data paths connecting it directly to sub-function 1 (functional block 12*b*) and sub-function 2 (functional block 12*e*). Functional block 12 is considered to be a "neighbor" of another functional block 12 if the two functional blocks are connected by a data path. Therefore, functional block 12*a* has two neighbors, namely neighbor 12*b* coupled by data path 22*b* and neighbor 12*e* coupled by data path 22*h*. The concept of neighbors is important because in one aspect of the present invention, a functional block can determine whether a neighbor block is to be activated ("turned-on") or deactivated ("turned-off").

If a functional block has N neighbors, it can be provided with N+1 output lines to individually control the activation or deactivation of each of its neighbors and itself. However, a functional block can also be provided with less than N+1 outputs if, for example, it does not need to control certain ones of its neighbors.

As will be discussed in greater detail subsequently, whether a functional block 12 is activated or deactivated is, in the present embodiment, determined by a signal on modulated clock line 18. If a functional block 12 is active, the mc signal on modulated clock line 18 to that particular functional block will oscillate at about the full clock rate. If a functional block is to be deactivated, the mc signal is essentially turned off.

The clock control buses 20*a* are input to clock control 16 to provide a plurality of clock control inputs. As will be discussed in greater detail subsequently, the clock control 16 uses the signals cc on clock control buses 20 to control the modulation of the mc signals on lines 18.

Clock control 16 has, as an input, an input clock on a line 28. As will be discussed in greater detail subsequently, this input clock is conditioned to provide the output clock regular (OCR) on line 24 and the modulated clocks (mc) on lines 18*a*–18*e*. It is considered advantageous in the present invention to have a centralized clock control 16 rather than having each of the functional blocks 12 having the circuitry shut off its own clock base on data flow. This is because the system 10, by having a centralized clock control 16, more accurately allows the control of skew across the circuit. As it is well known to those skilled in the art, skew becomes a substantial problem in high speed digital circuitry in that phase shifts between the clocks can accumulate to cause data errors. By dividing the system 10 into a number of functional blocks 12 and by providing a centralized clock controller, each of the modulated clocks 18 are substantially in phase, thereby minimizing skew problems.

Furthermore, by providing a centralized clock control 16, a "cascading" or "pipeline" effect can be achieved. With these effects, a particular functional block can cause a neighbor functional block to turn on, and that neighbor functional block can turn on the next functional block, etc. in the direction of data flow. Functional blocks that are no longer needed can be turned off behind the flow of data. Therefore, it is considered an important aspect of the present invention that a separate, centralized clock control 16 communicates with and controls the various functional blocks 12.

Figure 2:
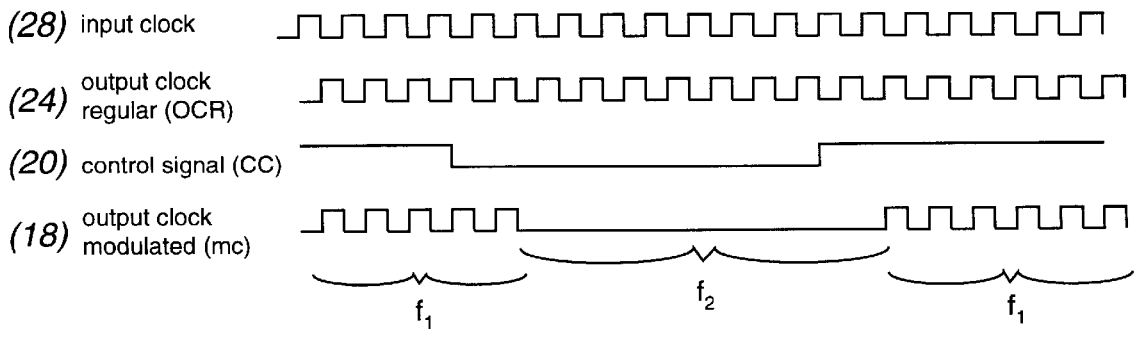
FIG. 2 is a clock control timing diagram of the circuit of FIG. 1.

In FIG. 2, a clock control timing diagram is illustrated. The input clock on line 28 is shown in the top row. Immediately below the input clock, the output clock regular (OCR) on line 24 is illustrated. A clock control signal (cc) from a bus 20 is shown below the output clock regular, and a modulated clock signal (me) on a line 18 is shown below the control clock signal.

As can been seen in FIG. 2, there is a "skew" between the input clock on line 28 and the output clock regular (OCR) on line 24. While the skew has been exaggerated for the purpose of illustration, some skew between the input clock and the output clock regular is inevitable. The signal of the output clock regular is combined with a control signal (cc) to produce the output clock modulated (mc). In this way, it is ensured that the output clock regular (OCR) and all of the output clock modulated (mc) on lines 18 are minimally skewed with respect to each other. In other words, the control signal (cc) is used to modulate the output clock regular (OCR) to provide a modulated output clock (mc) which is substantially in-phase with the output clock regular. It is highly preferable that any digital circuitry in the system 10 be operated from either the output clock regular (OCR) or from one of the modulated clock (mc) to minimize skew along the integrated circuit. In other words, the input clock on line 28 should only be used by the clock control 16 to develop the output clock regular, and not for system clocking purposes.

The modulated clock (mc) on lines 18 therefore operates at two fundamental frequencies: full on and off. In a first frequency $F_1$, the modulated clock signal mc on line 18 has about the same frequency as the output clock regular or, for that matter, the input clock on line 28 (except that it is relatively skewed with respect to the input clock). A typical frequency $F_1$ is about 40–80 megahertz. The second frequency $F_2$ is, in the present embodiment, 0 hertz. Therefore, a functional block 12 is either operating at full speed, or not at all. While it is also possible to have a frequency $F_2$ that is greater than 0 but less than frequency $F_1$ this will not be a desired mode of operation since there will some activity of the functional block 12 when it is not required by the system. Therefore, the modulated clock of the present invention preferably modulates between a full clock on and a clock off speed.

Figure 3:
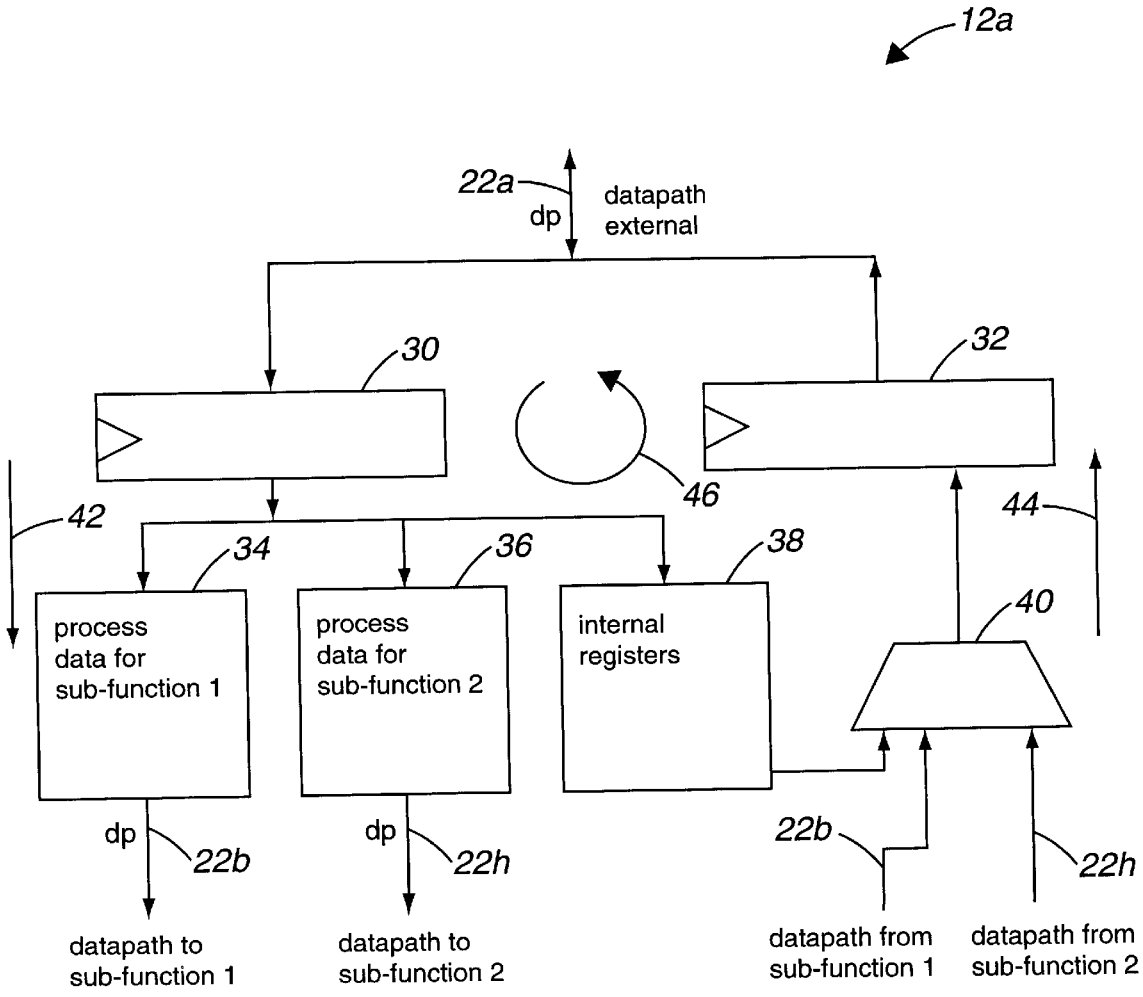
FIG. 3 is an example of a data flow for external interface 0 of FIG. 1.

In FIG. 3, a sample interface data flow is shown for functional block 12*a* (external interface 0). Here, the data paths 22*a*, 22*b*, and 22*h* have each been split into two data paths, i.e. unidirectional data paths that either lead from or lead to the external interface 0. The functional block 12*a* includes latches 30 and 32, logic 34 and 36, internal registers 38, and a multiplexer (MUX) 40. Again, this block diagram is shown for purposes of illustration, and the actual configuration of a functional block 12 will be dependent upon its functions, operating characteristics, and other system parameters.

The functional block 12*a* will be used to illustrate the concept of data flow. For example, data may flow in the direction indicated by arrow 42 from the data path external 22*a* to either the data path 22*b* or 22*h*. Data may also flow in the direction of arrow 44 from the data path 22*b* or the data path 22*h*. It is also possible for data to flow in a somewhat circular fashion as indicated by arrow 46 by flowing from the data path external 22*a* into the latch 30 and then into the internal register 38 and from there into MUX 40 and latch 32 and then out of the data path external 22*a*. In any event, the functional block 12*a* (which is typically implemented as a state machine) will know the direction of the data flow. This information can then be used to create the control signal (cc) on the clock control buses 20 to control which functional blocks will be activated and which functional blocks 12 will be deactivated. The design and operation of functional blocks 12, such as the functional block 12*a* of FIG. 3, are well known to those skilled in the art.

In this example, the data path external on line 22*a* is split into two branches depending upon the direction of data flow. In a first branch of the data path 22*a*, data flows into latch 30 which is then latched by a clock. The data can then flow into logic blocks 34 or 36 (depending upon the direction of data flow), and from there by placed onto data paths 22*b* or 22*h*, respectively. Alternatively, the data in latch 30 can be stored in internal register 38. The output of internal register 38 form inputs to MUX 40 along with data from data paths 22*b* and 22*h*. An output from MUX 40 is selected by control circuitry (not shown) to be stored in latch 32 and to be placed back on the data path external 22*a*.

Figure 4:
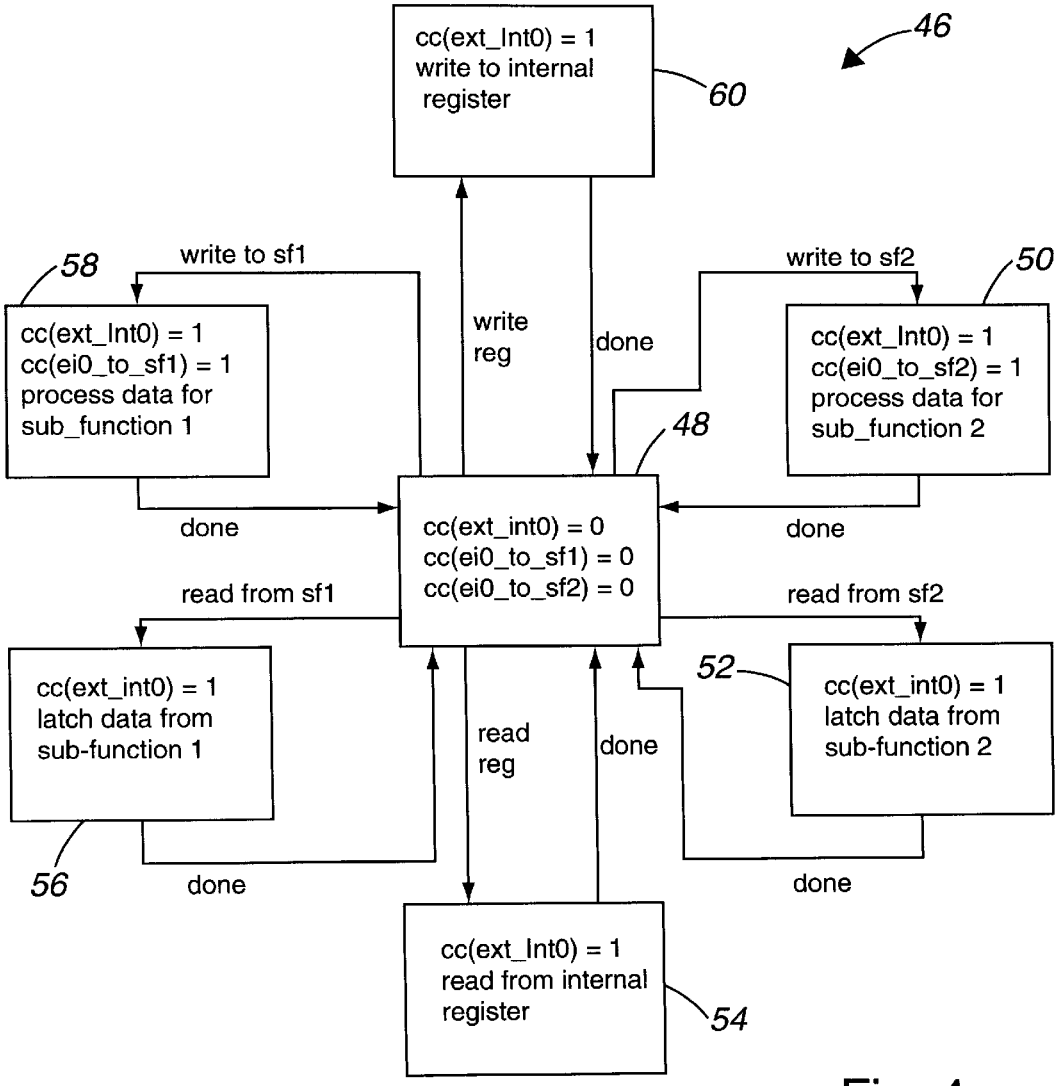
FIG. 4 is an example of a clock control decision flow for the external interface 0 of FIG. 1.

In FIG. 4, a state machine process 46 implemented by the functional block 12*a* of FIG. 3 is illustrated. The design and operation of state machines are, of course, well known to those skilled in the art. The state machine process 46 has a base or "idle" state 48 and a number of transient states 50, 52, 54, 56, 58, and 60. Again, this state machine process 46 is offered by way of example and not by way of limitation.

In FIG. 4, a number of clock control (cc) signals are developed with the following meanings:

cc (ext_int0) enables clock for external interface 0 cc (ei0_to_sf1) enables the clock for sub-function 1 when it is about to receive data from external interface 0 cc (ei0_to_sf2) enables the clock for sub-function 2 when it is about to receive data from external interface 0

In operation, the state machine process 46 idles in a base state 48. It should be noted that in this state, the clock control values for the external interface 0, the sub-function 1, and the sub-function 2 are all equal to 0, i.e., is indicated that all of these functional blocks should be deactivated. However, it should be noted that other control signals also go into the clock controller which may be activating one of these functional blocks independently of the idle state 48 of external interface 0. The state machine process 46 will remain in this idle state 48 until a command is received so that it can enter one of the transient states 50–60. For example, if a "write to sub-function 2" command is received, the state machine process 46 enters the transient state 50. In this state, the external interface 0 is activated (i.e. cc(ext_int0) is set to 1), as is the sub-function 2. Data is then processed for sub-function 2 and process control is returned to the idle state 48, where the functional block and its neighbors is deactivated. If the command "read from sf 2" is received, the transient state 52 is entered where the external interface 0 is activated and data is latched from subfunction2. Again, process control then returns to the idle state 48 where the functional blocks 12*a,* 12*b,* and 12*e* are all deactivated. If a "read register" command is received, the external interface 0 is activated and a read from the internal register is performed before returning to the idle state 48. If a "read from sub-function 1" is received, transient state 56 activates the clock for external interface 0 and latches data from subfunction 1 before returning to the idle state 48. If a "write to sub-function 1" is received, the external interface 0 is activated, as is sub-function 1 (functional block 12*b*). Data is then processed for sub-function 1 and the process re-enters the idle state 48. Finally, if a "write register" command is received, state 60 is entered wherein the external interface 0 is enabled and data is written to the internal register. Process control then returns to the idle state 48.

As it is apparent in the above example, the various functional blocks 12 are activated, as needed, and are deactivated after they have accomplished their task. When in an idle state, where data is not being processed, the clocks to the functional blocks are turned off. As noted previously, this greatly reduces the power consumption of the system.

Figure 5:
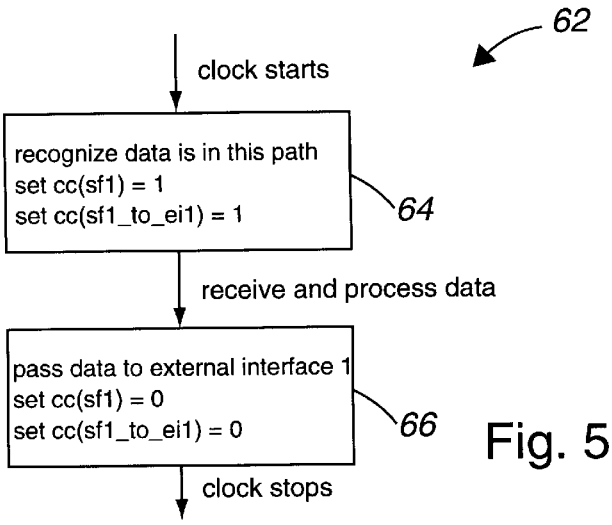
FIG. 5 is a flow diagram of an exemplary sub-function of FIG. 1.

FIG. 5 illustrates the operation of a sub-function block, such as subfunction block 1 (functional block 12*b*). When data passes from one functional block to another (for example, from external interface 0 to subfunction 1) the next functional block also impacts the clock control (cc) signals received by the clock control 16. Often, a sub-function type of functional block, such as sub-function 1, makes no decision affecting the data flow, but merely performs functions on the data before passing it directly to another block. In FIG. 5, a number of clock control (cc) signals are developed with the following meanings:

cc (sf1) enables the clock for sub-function 1 cc (ei0_to_sf1) enables the clock for sub-function 1 when it is about to receive data from external interface 0 cc (sf1_to_ei1) enables the clock for external interface 1 when it is about to receive data from sub-function 1

In FIG. 5, the clock for sub-function 1 is started in a step 64 when it is recognized that there is data in this path. Step 64 then activates both subfunction 1 and external interface 1 (functional block 12*c*). The data is then received and processed by sub-function 1 and, in a step 66, data is passed to external interface 1. Thereafter, sub-function 1 is deactivated, as in external interface 1, since they are no longer required, and both of their clocks are stopped to reduce power consumption.

Figure 6:
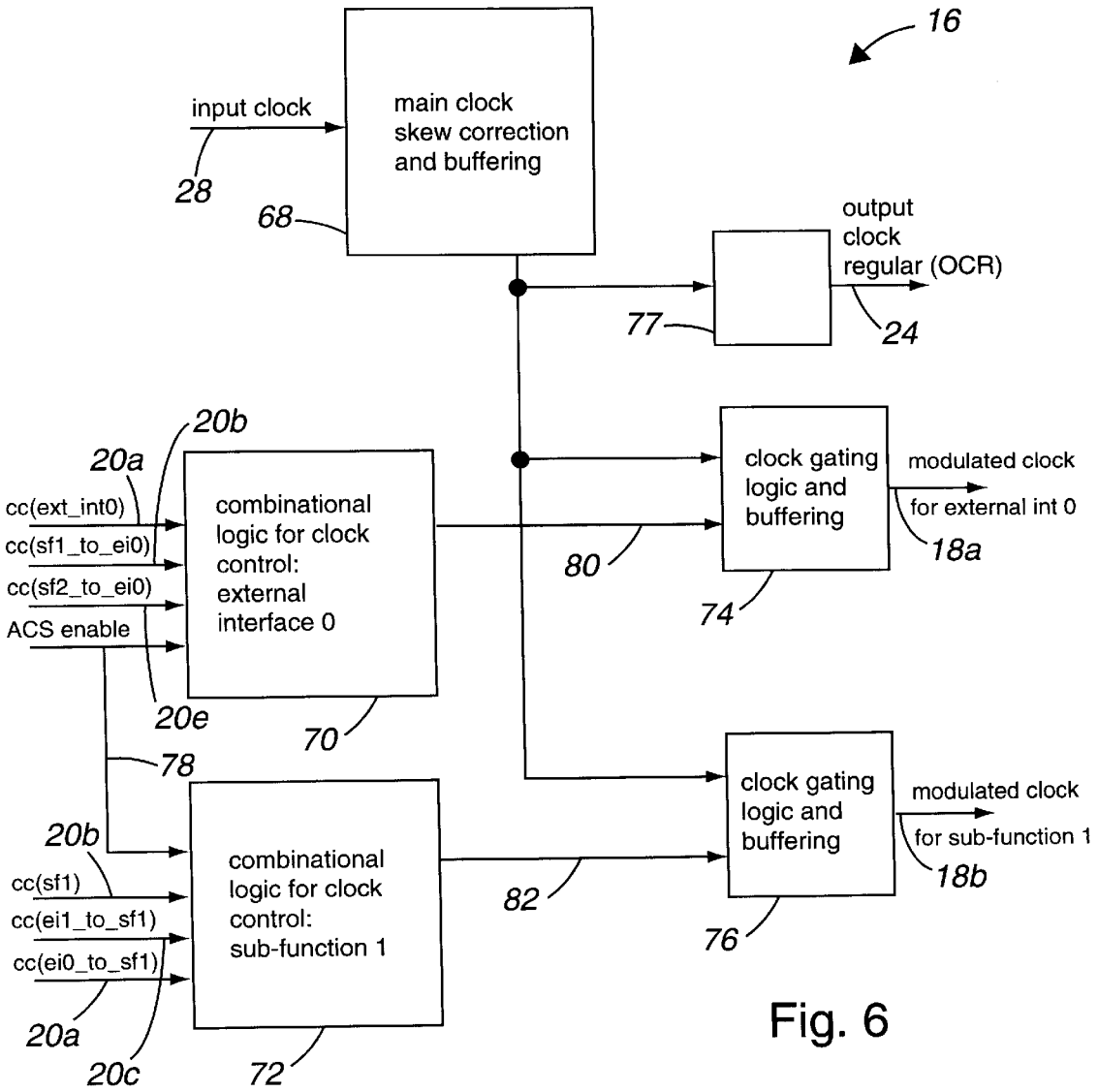
FIG. 6 is a block diagram of an exemplary clock control of FIG. 1.

In FIG. 6, a block diagram of clock control 16 of FIG. 1 is illustrated in greater detail. The clock control 16 includes a main clock skew correction and buffering logic 68, combinational logic 70, combinational logic 72, clock gating logic 74, clock gating logic 76, and a buffering block 77. It should be noted that this is only a subset of the entire functionality of clock control 16 and it only deals with the modulated clock signal mc for external interface 0 and the modulated clock signal mc for sub-function 1. However, it will be apparent to those skilled in the art how this can be extended to make and use the system 10 of FIG. 1.

The clock on line 28 is input to the main clock skew correction and buffering logic 68. Methods for providing skew control and buffering are well known to those skilled in the art. The output of logic circuit 68 is applied to buffering block 77 to produce the output clock regular (OCR) on line 24. The output of the buffering logic 68 is also provided to the clock gating logic 74 and 76. The purpose of the buffering block 77 is to minimize skew between the output clock regular on line 24 and the modulated clocks on lines 18*a* and 18*b* by emulating (with buffers) the delays caused by logic 74 and 76.

The combinational logic for clock control 70 and 72 have, as inputs, various clock control lines from clock control buses 20. Logic 70 and 72 also includes an "ACS enable" line 78 which turns on or off the power reduction system of the present invention. In other words, when the ACS line 78 is enabled, functional blocks 12 will be turned on and off as required, but when ACS is not enabled, all of the functional blocks 12 will be on all of the time, providing no power consumption reduction.

The combinational logic 70 receives various cc signals derived from clock control buses 20*a,* 20*b,* and 20*e.* In other words, the combinational logic for external interface 0 receives information from external interface 0 and its two neighbors, sub-function 1 and sub-function 2. The output from combinational logic 70 on a line 80 is input to the clock gating logic 74 where it "modulates" the output clock regular. By "modulation" it is meant that the signal on line 80 will allow the output clock regular to be passed through to line 18*a* when external interface 0 is to be activated, and the output clock regular is blocked from being placed on line 18*a* when the external interface is to be deactivated. In other words, the signal on line 80 "modulates" the output clock regular signal in a fashion very analogous to the way a modulation signal modulates a higher-frequency carrier signal in amplitude-modulated radio signals.

Similarly, combinational logic 72 has, as inputs, lines from buses 20*a,* 20*b,* and 20*c.* In other words, combinational logic 72 receives clock control inputs from sub-function 1 and to its immediate neighbors, external interface 0 and external interface 1. The combinational logic 72 then provides a signal on a line 82 which modulates the output clock regular signal on line 24 within the clock gating logic 76. Similarly, as discussed above, the "modulation" performed by the signal on line 82, permits the output clock regular to be coupled to sub-function 1 when sub-function 1 is to be activated, and prevents the clock from being applied to sub-function 1 when sub-function 1 is to be deactivated.

Figure 7:
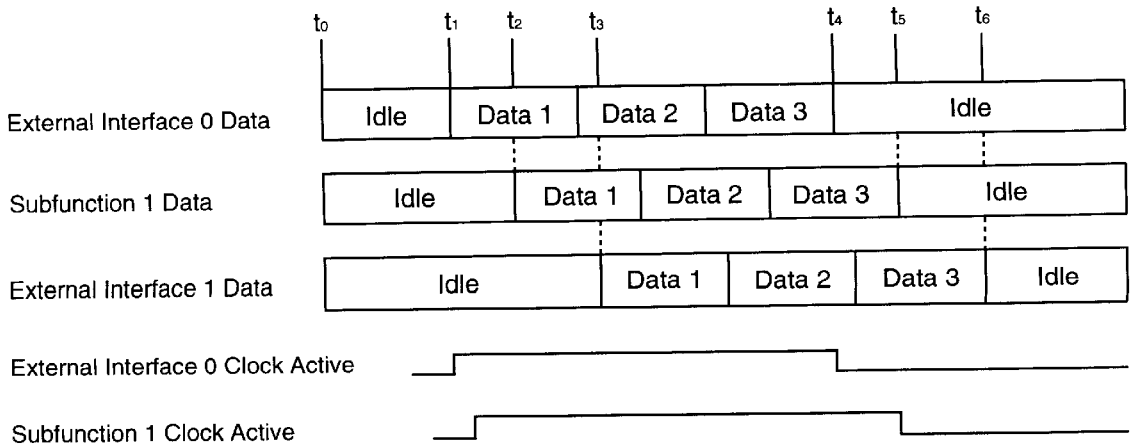
FIG. 7 is an example of data flow from an external interface 0 to external interface 1 of FIG. 1.

FIG. 7 illustrates an example of data flow from external interface 0 to external interface 1. Initially, at a time T0, the external interface 0 data is idled as is the sub-function 1 data and the external interface 1 data. Then, at a time T1, there is a data 1 present at external interface 0. This causes the external interface 0 clock to become active and, a short time later, a sub-function 1 clock to become active. Then at a time T2, the data 1 is passed to sub-function 1 which, after a time delay, causes the external interface 1 clock to become active. Then, at a time T3, the data 1 is passed to external interface 1. In the meantime, data2 and data3 are serially present at external interface 0 and are subsequently passed onto sub-function 1 and external interface 1 in a pipeline fashion.

Once the last of the data3 is gone from an external interface 0 at a time T4, the external interface 0 clock is deactivated. Once the last of data 3 is gone from subfunction 1, at a time T5, the sub-function 1 clock is deactivated. Finally, once the last of data 3 is gone from external interface 1, at a time T6, the external interface 1 clock is deactivated. These functional blocks are then in a low-power idle or standby mode.

As will apparent from the above discussion, the activation and deactivation of the various functional blocks 12 is dependent upon the flow of data within system 10. If data is flowing in the direction of a particular functional block, that functional block is activated to receive the data in a cascading or pipelining fashion. As a particular functional block has completed its task and has returned to an idle state, it is deactivated to conserve power.

While this invention has been described in terms of several preferred embodiments, there are alterations, permutations, and equivalents which fall within the scope of this invention. It should also be noted that there are may alternative ways of implementing both the process and apparatus of the present invention. For example, while the functional blocks described above have been deactivated by removing their mc clock signals, it is also possible to deactivate the functional blocks 12 by additionally removing their power (it is not good practice to turn off power to a block without turning off the clock to the block). This can be accomplished by turning off the portion of the power rail that feeds a particular functional block. This can result in substantially greater power savings that simply turning off the clock to a functional block, since the pad drivers of the functional block consume power even if the clock is turned off. As another example, inverting the polarity of a logical signal (such as acc line) such that a "0" has the meaning of a "1" in the present description and vice versa, is an equivalent alteration well known to those skilled in the art.

It is therefore intended that the following appended claims be interpreted as including all such alternations, permutations, and equivalents as fall within the true spirit and scope of the present invention.

What is claimed is:

1. An integrated circuit with power conservation comprising:

a plurality of functional blocks, each of which includes digital circuitry and at least one output control line, each of said functional blocks including a modulated clock input; and a power controller coupled to said at least one output control line of each of said functional blocks such that said power controller is responsive to a plurality of control lines, said power controller reducing power consumed by selected functional blocks in response to control signals on said plurality of control lines, wherein said power controller comprises a clock controller which provides a plurality of modulated clocks in response to said control signals on said plurality of control lines, wherein said clock controller is coupled to a modulated clock input of each of said functional blocks to provide a modulated clock for each of said functional blocks;

wherein at least two of said functional blocks are coupled together as neighboring functional blocks, and wherein both of said neighboring functional blocks include a control line for itself and its neighbor to provide control signals to said clock controller.

2. An integrated circuit as recited in claim 1 wherein said functional blocks are coupled together for a flow of data between said functional blocks, and wherein each particular functional block includes N+1 control lines coupled to said clock controller, where N is the number of neighbor functional blocks of said particular functional block.

3. An integrated circuit as recited in claim 2 wherein a particular functional block can provide a control signal to said clock controller to shut off said particular functional block or a neighbor functional block.

4. An integrated circuit as recited in claim 1 wherein said clock controller has an input clock, wherein signals on said plurality of control lines are used to modulate said input clock to produce said modulated clocks.

5. An integrated circuit as recited in claim 4 wherein said clock controller further provides an output clock regular derived from said input clock, wherein there is a substantial, relative skew between said input clock and said output clock regular, but wherein there is little relative skew between said output clock regular and said modulated clocks.

6. A system with power conservation comprising:

a plurality of functional blocks capable of processing data, each of said functional blocks including a modulated clock input and N+1 clock control lines, where N is the number of neighbors of a particular functional block that are connected to said particular functional block by at least one data path; and a clock controller having an input clock, said clock controller being coupled to said modulated clock inputs and said clock control lines, said control controller being operative to modulate said input clock in accordance with signals on said clock control lines to provide modulated clocks to each of said plurality of functional blocks, said modulated clocks reducing power consumption of functional blocks which are not needed to process data.

7. A system with power conservation as recited in claim 6 wherein said modulated clocks are skewed with respect to said input clock.

8. A system with power conservation as recited in claim 7 further comprising an output regular clock which is skewed with respect to said input clock, but which is substantially in phase with said modulated clocks.

9. A system with power conservation as recited in claim 6 wherein one of said modulated clocks for a particular functional block has a frequency of about the same frequency as said input clock when said particular functional block is in operation, and has a frequency of about zero when said particular functional block is not in operation.

10. A system with power conservation as recited in claim 6 wherein a particular functional block can provide a signal to turn itself off or to turn off one or more of its neighbors.

11. A system with power conservation as recited in claim 6 wherein each of said functional blocks is provided data flow recognition circuitry which recognizes the direction of data flow, and with clock control line circuitry which provides signals on said clock control lines such that a neighbor functional block in the direction of data flow is active to process data.

12. A system with power conservation as recited in claim 11 wherein said clock control line circuitry further provides signals on said clock control lines such that a neighbor function block not in the direction of data flow is not active.

13. A system with power conservation as recited in claim 11 wherein said clock control circuitry further provides signals on said clock control lines such that one of said modulated clocks to said particular functional block causes said particular functional block to not be active.

14. A system with power conservation as recited in claim 6 wherein said clock controller includes:

a main clock skew corrector receptive to said input clock and operative to produce an output clock regular;

a plurality of combinational logic circuits, each receptive to clock control lines of a respective functional block and operative to develop a modulation signal for said respective functional block; and a plurality of clock gating logic circuits associated with respective ones of said plurality of combinational logic circuits, where each of said plurality of clock gating logic circuits is responsive to an associated modulation signal and to said output clock regular, and is operative to produce a plurality of modulated output clocks associated with respective ones of said plurality of functional blocks.

15. A method for reducing power consumption in a digital electronic circuit comprising the steps of:

receiving control signals from a plurality of functional blocks indicating requests from said functional blocks;

deactivating a particular functional block upon a request from said particular functional block or from another functional block, and in the absence of a request from another functional block requesting the activation of said particular functional block, wherein said particular functional block consumes less power when deactivated than when activated; and activating a particular functional block upon a request from another functional block.

16. A method for reducing power consumption as recited in claim 15 wherein the deactivation of a particular functional block is accomplished by the step of reducing the frequency of a clock provided to said particular functional block.

17. A method for reducing power consumption as recited in claim 16 wherein said step of reducing the frequency of a clock is accomplished by modulating a regular clock with a modulation signal to provide a modulated clock such that a frequency of said modulated clock is either about the frequency of said regular clock or is about zero.

18. A method for reducing power consumption as recited in claim 15 further comprising the steps of:

within each particular functional block, determining a direction of data flow; and creating modulated clocks for neighboring functional blocks of said particular functional blocks which controls their activation and deactivation.

19. A method for reducing power consumption as recited in claim 18 further comprising the steps of requesting the activation of a neighbor functional block that is in the direction of data flow, and requesting the deactivation of a neighbor functional block that is not in the direction of data flow.

20. An integrated circuit with power conservation comprising:

a plurality of functional blocks, each of which includes digital circuitry and at least one output control line which carries control signals that pertains to potential power usage in said integrated circuit; and a power controller coupled to said at least one output control line of each of said functional blocks such that said power controller is responsive to said control signals on a plurality of control lines, said power controller reducing power consumed by selected functional blocks in response to said control signals.

21. An integrated circuit as recited in claim 20 wherein each of said functional blocks further includes a clock input, and wherein said power controller is a clock controller coupled to said clock input of each of said functional blocks, such that power can be reduced by reducing the frequency of a particular clock at a clock input of a particular functional block.

22. An integrated circuit as recited in claim 21 wherein said clock input of each of said functional blocks is a modulated clock input, and wherein said clock controller is operative to provide a plurality of modulated clocks, one each, to said functional blocks in response to said control signals on said plurality of control lines.

23. An integrated circuit as recited in claim 22 wherein said functional blocks are coupled together for a flow of data between said functional blocks, and wherein each particular functional block includes N+1 control lines coupled to said clock controller, where N is the number of neighbor functional blocks of said particular functional block.

24. An integrated circuit as recited in claim 23 wherein a particular functional block can provide a control signal to said clock controller to shut off said particular functional block or a neighbor functional block.

25. An integrated circuit as recited in claim 22 wherein said clock controller has an input clock, wherein signals on said plurality of control lines are used to modulate said input clock to produce said modulated clocks.

26. An integrated circuit as recited in claim 25 wherein said clock controller further provides an output clock regular derived from said input clock, wherein there is a substantial, relative skew between said input clock and said output clock regular, but wherein there is little relative skew between said output clock regular and said modulated clocks.

*27. A system of circuits with power conservation, comprising:*

*a plurality of functional blocks capable of processing data, each of the blocks including digital circuitry and at least one output control line that carries control signals pertaining to potential power usage; and*

*a power controller coupled to each of the output control lines such that the power controller is responsive to the control signals on a plurality of control lines, the power controller being configured and arranged to reduce power consumed by selected functional blocks in response to the control signals.*

*28. A system of circuits with power conservation, according to claim 27, wherein the power controller is configured and arranged to reduce power consumed by selected functional blocks by modulating clock signals driving the selected functional blocks.*

*29. A system of circuits with power conservation, according to claim 27, wherein the power controller is configured and arranged to reduce power consumed by selected functional blocks by modulating operating power supplied to the selected functional blocks.*

*30. A system of circuits with power conservation, according to claim 27, wherein at least one of the plurality of functional blocks includes an external interface.*

*31. A system of circuits with power conservation, comprising:*

*a plurality of functional blocks capable of processing data, each of the blocks including digital circuitry and at least one output control line that carries control signals pertaining to potential power usage; and*

*a power controller coupled to each of the output control lines such that the power controller is responsive to the control signals on a plurality of control lines, the power controller being configured and arranged to reduce power consumed by selected functional blocks by modulating clock signals driving the selected func-*

*tional blocks and by modulating operating power supplied to the selected functional blocks.*

*32. A system of circuits with power conservation, according to claim 27, wherein at least one of the plurality of functional blocks includes an external interface.*

*33. A system of circuits with power conservation, comprising:*

*a plurality of functional blocks capable of processing data, each of the blocks including digital circuitry and at least one output control line that carries control signals pertaining to potential power usage; and*

*power consumption means for controlling power consumption, the power consumption means being coupled to each of the output control lines such that the power consumption means is responsive to the control signals on a plurality of control lines, the power consumption means and the functional blocks being configured and arranged to reduce power consumed by selected functional blocks by modulating clock signals driving the selected functional blocks and by modulating operating power supplied to the selected functional blocks.*

*34. A method for conserving power in a system having a plurality of functional blocks capable of processing data, each of the blocks including digital circuitry, the method comprising:*

*from each of the functional blocks, generating control signals on at least one output control line, the control signals pertaining to potential power usage; and*

*reducing power consumed by selected functional blocks in response to the control signals by modulating at least one clock signal driving the selected functional blocks.*

*35. A method, according to claim 34, further comprising reducing power consumed by selected functional blocks by modulating clock signals driving the selected functional blocks.*

*36. A method, according to claim 34, further comprising reducing power consumed by selected functional blocks by modulating operating power supplied to the selected functional blocks.*

*37. A method for conserving power in system having a plurality of functional blocks capable of processing data, each of the blocks including digital circuitry, the method comprising:*

*from each of the functional blocks, generating control signals on at least one output control line, the control signals pertaining to potential power usage; and*

*in response to the control signals, reducing power consumed by selected functional blocks by modulating clock signals driving the selected functional blocks and by modulating operating power supplied to the selected functional blocks.*

* * * * *

UNITED STATES PATENT AND TRADEMARK OFFICE

CERTIFICATE OF CORRECTION

PATENT NO. : RE 36,839
DATED : August 29, 2000
INVENTOR(S) : Simmons et al.

It is certified that error appears in the above-identified patent and that said Letters Patent is hereby corrected as shown below:

Title page,
ABSTRACT,
Line 2, after "includes", please delete -- a --.
Line 7, "controller the reduces" should read -- controller then reduces --.

Column 10,
Line 27, "said control controller" should read -- said clock controller --.

Signed and Sealed this

Second Day of April, 2002

*Attest:*

*Attesting Officer*

JAMES E. ROGAN
*Director of the United States Patent and Trademark Office*